J. S. CARLITZ.
SEALING RING.
APPLICATION FILED MAR. 21, 1914.

1,194,273.  Patented Aug. 8, 1916.

Witnesses—

Inventor—
Joseph S. Carlitz.
by his Attorneys—
Howson & Howson

UNITED STATES PATENT OFFICE.

JOSEPH S. CARLITZ, OF PHILADELPHIA, PENNSYLVANIA, ASSIGNOR TO RENO MANUFACTURING COMPANY, OF PHILADELPHIA, PENNSYLVANIA, A CORPORATION OF PENNSYLVANIA.

SEALING-RING.

1,194,273.  Specification of Letters Patent.  Patented Aug. 8, 1916.

Original application filed June 27, 1910, Serial No. 569,079. Renewed October 20, 1913, Serial No. 796,516. Divided and this application filed March 21, 1914. Serial No. 826,395.

*To all whom it may concern:*

Be it known that I, JOSEPH S. CARLITZ, a citizen of the United States, residing in Philadelphia, Pennsylvania, have invented certain Improvements in Sealing-Rings, (being division of application filed June 27, 1910, Serial No. 569,079, and renewed October 20, 1913, Serial No. 796,516,) of which the following is a specification.

One object of my invention is to provide a sealing ring such as may be used as a gasket or washer for preventing leakage of air or liquid between two opposed surfaces, and which shall be of such a nature as to be relatively inexpensive, durable, and not likely to deteriorate either when in use or otherwise.

I further desire to provide a gasket or washer having the above noted characteristics and particularly designed for use as a sealing means for jar closures, which, in addition to containing material especially adapted for preventing leakage through or past it, shall have an impervious coating or covering which effectually prevents the escape of such material from the washer or gasket and thus maintains it in a soft or pliable condition ready for use.

These objects and other advantageous ends I secure as hereinafter set forth, reference being had to the accompanying drawings, in which:—

Figure 1:
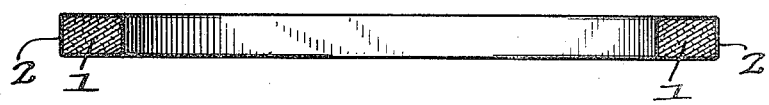
Figure 2:
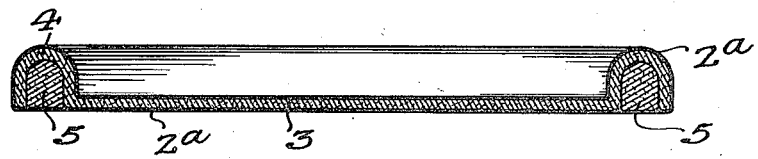

Figure 1, is a vertical section of a sealing ring or washer embodying my invention, and Fig. 2, is a vertical section of a combined sealing ring and cap especially adapted for use in connection with fruit jars.

In Fig. 1, the body 1 of the washer is composed of some relatively loose fiber or other porous material, which is soaked or impregnated with a substance such, for example, as glycerin, which is peculiarly adapted for maintaining the ring in a soft, pliable condition and at the same time capable of effectually preventing the leakage of gases or liquids through it. It so happens, however, that many of the liquids best adapted for this purpose and particularly the glycerin above referred to tend to go into solution with many liquids to which the ring may be exposed and for the purpose of preventing this, each washer according to my invention is first filled or otherwise treated with the glycerin or other liquid, and is thereafter dipped in a solution of some substance capable of subsequently hardening on its surface to form an hermetical seal so as to effectually retain within the ring whatever material may have been previously applied to it. For this purpose, I preferably use a suitable solution of gun cotton or pyroxylin. It will be understood that the coating 2 of pyroxylin is relatively thin and in no way interferes with the flexibility of the washer or ring. At the same time it effectually seals it so as to prevent the escape of glycerin or other substance with which it has been treated and is neither affected by ordinary changes of temperature nor is it acted on by hot or cold water or vegetable acids.

In Fig. 2, I have shown a form of sealing ring particularly adapted for sealing a jar having a screw cover; the sealing ring in this instance consisting of a central disk portion 3 whose edge is formed into a U-shaped corrugation 4. Within the annular recess of said corrugation is a ring 5 preferably of relatively porous wood pulp; the disk and its corrugated edge being preferably formed of pulp board. In this case, the ring 5 is soaked or filled with glycerin, with or without other substances whereby it is best adapted to prevent leakage and is retained in a soft and pliable condition, after which the structure as a whole is dipped into a solution of pyroxylin or an equivalent material capable of withstanding temperatures such as 200° F. and insoluble in the liquids ordinarily found in the jars to which my invention may be applied, thereby forming an impervious coating $2^a$ completely surrounding or inclosing it.

It is obvious that in such a case as that illustrated in Fig. 1, the washer may be made of any suitable fibrous material such as wood pulp, asbestos, or the like and may be soaked or otherwise filled with any desired material such as the glycerin above noted, oil, etc., after which it is dipped in the pyroxylin solution and provided with the impervious coating 2.

I claim:—

1. A packing for a closure consisting of a body of porous material impregnated with a normally liquid substance and having a coating of pyroxylin.

2. A packing for a closure consisting of a body of wood pulp impregnated with glycerin and provided with a coating of pyroxylin.

3. A packing for a sealing closure made of relatively porous material containing a substance for maintaining it in a pliable condition; said substance being of a nature to be capable of escaping from said material under normal conditions; with an impervious coating on the closure for preventing escape of the substance for keeping it pliable.

In testimony whereof, I have signed my name to this specification, in the presence of two subscribing witnesses.

JOSEPH S. CARLITZ.

Witnesses:
  E. STANLEY RICHARDSON,
  W. WALLACE TODD.